US007089983B2

(12) United States Patent
Li

(10) Patent No.: US 7,089,983 B2
(45) Date of Patent: Aug. 15, 2006

(54) FILM STICKING/TESTING EQUIPMENT

(75) Inventor: Hsing-Wu Li, Hsin Chuang (TW)

(73) Assignee: Sentelic Corporation, Hsin Chuang (TW)

( * ) Notice: Subject to any disclaimer, the term of this patent is extended or adjusted under 35 U.S.C. 154(b) by 96 days.

(21) Appl. No.: 10/784,282

(22) Filed: Feb. 24, 2004

(65) Prior Publication Data

US 2005/0183498 A1 Aug. 25, 2005

(51) Int. Cl.
*B32B 37/22* (2006.01)
*B32B 41/00* (2006.01)
*G01N 19/00* (2006.01)

(52) U.S. Cl. ...................... 156/378; 156/361; 156/379; 156/542; 156/541

(58) Field of Classification Search ................ 156/361, 156/362, 378, 379, 540, 541, 542, DIG. 24, 156/DIG. 42; 73/150 A
See application file for complete search history.

(56) References Cited

U.S. PATENT DOCUMENTS 6,516,854 B1 * 2/2003 Tsai ............................ 156/542

* cited by examiner

*Primary Examiner*—George Koch

(57) ABSTRACT

A film sticking/testing equipment mainly includes a transmission mechanism, a film sticking apparatus and a test apparatus. The transmission mechanism is used for delivering at least a touch pad. The film sticking apparatus has a film release base to allow a protect film being released from a rolling belt, which temporarily adheres with the protect film. The protect film is attracted by the film sticking apparatus and adhered to the surface of the touch pad by way of vacuum suction. The testing apparatus provides a test rod traveling along a preset locus on the touch pad to take the output test value of the touch pad and input to the computer device such that the test value is compared with the preset value in the computer device to distinguish qualified touch pads from unqualified touch pads.

1 Claim, 2 Drawing Sheets

FILM STICKING/TESTING EQUIPMENT

BACKGROUND OF THE INVENTION

1. Field of the Invention

The present invention is related to a film sticking/testing equipment and particularly to an equipment can automatically perform a protect film being adhered to a touch pad and automatically carry out test for the touch pad completely.

2. Brief Description of Related Art

In order to meet requirement of high speed, high effect and a size of lightness, thinness, shortness and smallness, miniature is a trend for developing various electronic parts. Hence, portable electronic devices such as notebook computer, cell phone, electronic dictionary, personal digital assistance, web pad and tablet computer are becoming the main stream products. Further, the computer has become an indispensable part of our daily routine life due to the information industry growing vigorously.

Taking the notebook computer as an example, a mouse is used as an operation control interface, i.e., input interface for the notebook computer and the user can operate the buttons of the mouse to control various functions built in the main unit system in the notebook computer. In another word, the operation of the notebook computer is by way of wire transmission. The mouse is connected to the notebook computer with a transmission wire but the transmission wire also a limitation for the user to operate the notebook computer conveniently. In order to overcome the deficiency, the notebook computer currently is equipped with a touch pad on the main body thereof and the cursor on the screen can be moved by way of the fingertip sliding on the touch pad instead of the mouse.

It is worth to note that the touch pad is adhered with a protect film at the upper surface thereof before being assembled to the main body of the notebook computer for the fingertip of the user being able to slide on the protect film repeatedly so as to prevent the touch pad from being scraped. At the present time, the protect film mostly is adhered to the touch pad manually or semi-automatically with aid of a fixture, that is, the protect film from being released till being stuck is not completely automatically worked. Under this circumstance, the assembly job for the protect film is time consuming such that the production efficiency and the perfection rate of the touch pad are affected seriously.

Besides, a test of sensitivity is usually performed after the touch pad being adhered with the protect pad and unqualified touch pad and qualified touch pad are dispensed at the same time too. However, the conventional test procedure is done manually and, for instance, a touch pen is slid on the touch pad, which is electrically connected to a computer device, and the screen can show displacement of the curser for the test person judging the sensitivity of the touch pad with visual sight. Because the conventional test method is tedious, it is easy to result in inconsistent standard of quality control due to different test persons having subjective factors different from each other and it results in perfection rate of the touch pad is lowered.

SUMMARY OF THE INVENTION

An object of the present invention provides a film sticking/testing equipment, which can perform film sticking operations to the touch pad automatically, so as to shorten the time for mounting the protect film and enhance the production efficiency of the touch pad.

Another object of the present invention is to provide film sticking/testing equipment, which is suitable for performing film sticking and testing for at least a touch pad to enhance testing efficiency and increase perfection rate of the touch pad.

The film sticking/testing equipment according to the present invention mainly includes a transmission mechanism, a film sticking apparatus and a test apparatus. The transmission mechanism provides at least an input end and an output end. The touch pad can be loaded on the transmission mechanism so that the touch pad can move along a delivering path.

The film sticking apparatus is disposed above the transmission mechanism and at the delivering path behind the input end. The film sticking apparatus is composed of multiple rollers, a rolling belt, a film release base and a film adhering device. The rolling belt is adhered with a protect film and wound on the rollers. The film release base has a turning corner and is disposed between any two of the rollers and the rolling belt winds up at the turning corner. The protect film on the rolling belt can move to the turning corner and depart from the surface of the rolling belt at the turning corner. The film adhering device is disposed at a side of the turning corner with a spacing between the film and the turning corner. The film adhering device is used for attracting the protect film departing from the rolling belt and adhering the protect film on the upper surface of the touch pad.

The testing apparatus is connected to the transmission mechanism and disposed on the delivering path behind the film adhering device. The test apparatus is composed of a test platform, a computer device and at least a test rod. The test platform is provided with at least a test probe and the touch pad is delivered to the test platform with the contact spot at the bottom of the touch pad contacting with the test probe while the touch pad is tested. The computer device is electrically connected to the probe and the test rod is moved on the upper surface of the touch pad along a preset path and carries the test value output of the touch pad to input to the computer device and the test value can be compared with the preset value in the computer device.

According to the preferred embodiment of the present invention, one of the preceding rollers is a feed roller and the rolling belt at an end thereof is fixed to the feed roller, which can be such as a driven roller. Besides, one of the preceding rollers is a take up roller and another end of the rolling belt is fixed to the take up roller, which can be such as a driving roller to drag the rolling belt and allow the protect film on the rolling belt moving along the turning corner of the film release base for winding up the blank rolling belt. Further, one of the rest rollers is a delivering roller disposed between the feed roller and the take up roller and the delivering roller can be such as a driven roller for the rolling belt moving more successfully.

According to the preferred embodiment of the invention, the preceding film adhering device is mainly composed of a suction device and an actuation device. The suction device is composed of at least a vacuum tube, a suction disc and a sucking air machine. The suction disc has a plurality of attracting apertures at the surface thereof and is disposed at an end of the vacuum tube. The vacuum tube communicates with the attracting apertures and the sucking air machine is disposed on the vacuum tube for withdrawing the air in the vacuum tube and constituting lower air pressure or a state of vacuum so as to allow the suction disc attracting the protect film. The actuation device is connected to the suction device to move the suction device such that the protect film attracted by the suction disc can be adhered on the upper surface of the touch pad.

According to the preferred embodiment of the present invention, the film adhering device further includes an alignment device, which is composed of a L shaped stop block and at least an urging part. The L shaped stop block is mounted to the sucking disc and the urging part is disposed at a lateral side of the sucking disc. The urging part is suitable for pushing the edge of the protect film so that the protect film is pressed against the L shaped stop block as a basis of positioning.

According to the preferred embodiment of the present invention, the preceding testing apparatus further includes a distribution device, which is composed of at least a bearing tray and a sliding servo table. The bearing tray is used for supporting touch pads and the servo table connects with the bearing tray for moving the bearing tray and dispensing the touch pads.

The completely automatic film sticking/testing equipment of the present invention provides a film sticking apparatus and a test apparatus. The film sticking apparatus allows the protect film temporally adhering on the rolling tape can be released automatically by way of a film release base and the released protect film can be attracted with vacuum suction and adhered to the surface of a touch pad to shorten the work hour for mounting the protect film and enhance the production efficiency of the touch pad. The test apparatus provides mechanical test probes moving a preset path on the touch pad and bringing output test value of the touch pad to input to the computer. The test value is compared to a preset value in the computer to sort qualified touch pads and unqualified touch pads so as to enhance the test efficiency and increasing perfection rate.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE PREFERRED EMBODIMENT

Figure 1:
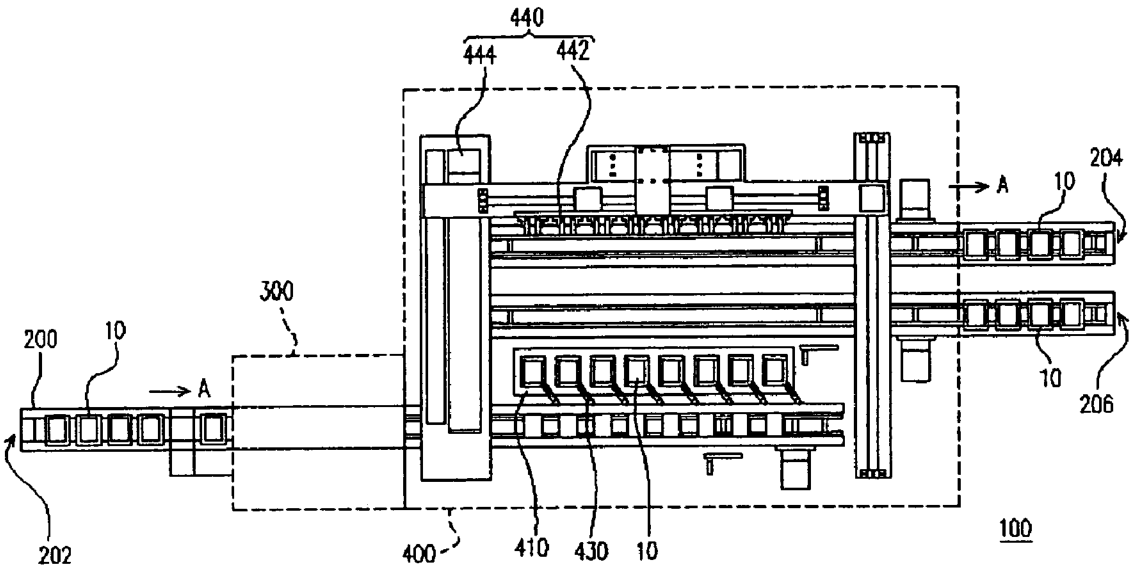
FIG. 1 is a plan view of film sticking/testing equipment according to a preferred embodiment of the present invention.

Referring to FIG. 1, the sticking film/test equipment 100 of the present invention is suitable for performing sticking film and testing operation automatically for multiple touch pads 10. The sticking film/test equipment 100 mainly includes a transmission mechanism 200, a sticking film apparatus 300 and a test apparatus 400.

The transmission mechanism 200, for instance, is composed of a conveying belt and a driving device. The driving device can actuate the conveying belt to rotate and the touch pads 10 are loaded on the transmission mechanism 200 so that the touch pads 10 can move along a delivering path A. The transmission mechanism 200 provides at least an input end and an output end and the transmission mechanism 200 has an input end 202 and two output ends 204, 206. The output end 204 is used for delivering unqualified touch pads 10 and the output end 206 is used for delivering qualified touch pads.

Figure 2:
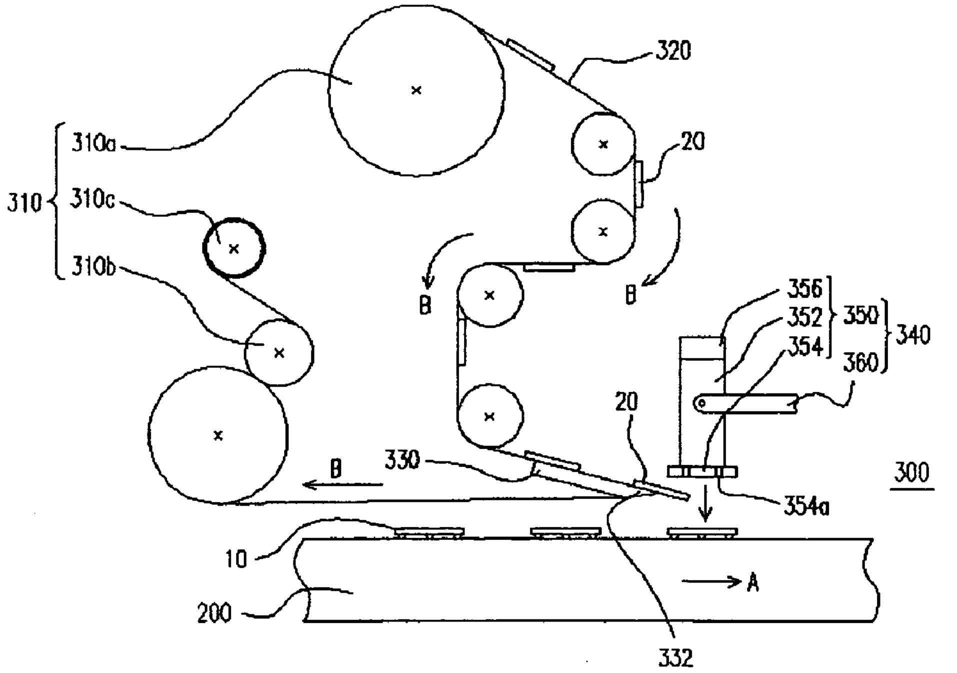
FIG. 2 is a plan view of film sticking apparatus in the preferred embodiment of the present invention.

Referring to FIG. 2, the film sticking apparatus 300 is disposed above the transmission mechanism 100 at the delivering path A behind the input end 202. The sticking film apparatus 300 is composed of multiple rollers 310, a rolling belt 310, a film release base 330 and a film adhering device 340. The rolling belt 320 has a smooth surface and is adhered with multiple protect films 20 and the rolling belt 320 is wound on the rollers 310 so that the rolling belt 320 can be driven by the rollers 310 to move along another delivering path B. The rollers 310 include a feed roller 310*a*, a take up roller 310*b* and a plurality of delivering rollers 310*a*. The feed roller 310*a* can be such as a driven roller and the rolling belt 320 at an end thereof is attached to the feed roller 310*a*. Most of the rolling belt 320, which is adhered with a protect film 20, are wound on the feed roller 310*a*. Besides, the rolling belt 320 at another end thereof is attached to the take up roller 310*b*, which can be such as a driving roller to drag the rolling belt 320 and wind up the blank belt 320 after releasing the film. Further, the delivering roller 310*c* is disposed between the feed roller 310*a* and the take up roller 310*b*. The delivering roller 310*c* can be such as a driven roller. There is no limitation to the number of the delivering rollers 310*c* so that the rolling belt 320 can move more successfully.

The film release base 330 shown in FIG. 2 has a turning corner 332 and is disposed between any two of the rollers 310. The film release base 330 is disposed between the delivering roller 310*c* and the take up roller 310*b* in the present embodiment and the rolling belt 320 winds up at the turning corner 332. Due to the preceding take up roller 310*b* rotating, the protect film 20 on the rolling belt 320 can move to the turning corner 332 and the protect film 20 can depart from the surface of the rolling belt 220 at the turning corner 332 horizontally.

Besides, the film adhering device 340 is disposed at a side of the turning corner 340 with a spacing being formed between the film and the turning corner 340. The film adhering device 340 is composed of a suction device 350 and an actuation device 360. The suction device 350 is composed of at least a vacuum tube 352, a suction disc 354 and a sucking air machine 356. The sucking disc 354 has at the surface thereof a plurality of sucking apertures 354*a* and is disposed at an end of the vacuum tube 352 to communicate with the sucking apertures 354*a*. The air sucking machine 356 is disposed on the vacuum tube 352 to withdraw the air in the vacuum tube 352 so that lower air pressure or even a state of vacuum is formed in the vacuum tube 354 to allow the protect film 20 releasing from the surface of the rolling belt 320. Because the protect film 20 has a certain extent of hardness, the protect film can release from the surface of the rolling belt 320 easily while the rolling belt 320 moves to the turning corner 332 so that a spacing is kept between the film adhering device 340 and the turning corner 332 can obtain an effect of attracting the protect film 20 by way of vacuum suction.

The actuating device 360 such as a connecting rod is connected to the suction device 350 to actuate the suction device moving. The protect film 20, which is sucked by the sucking disc 354, is adhered to the touch pad 10 to complete the assembly operation of film sticking. Hence, it can be learned that the whole process performed by the film adhering device from film releasing to film adhering is completely automatic and it is not necessary to stick the film to the touch pad manually. Thus, the work hour for assembling the protect film can be shortened and the production efficiency for the touch panel can be enhanced effectively.

Figure 3A:
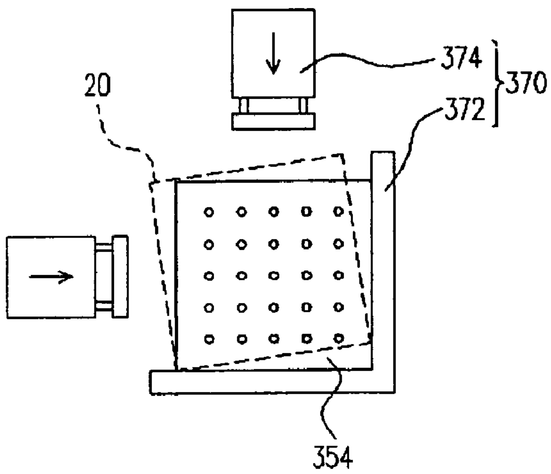
FIGS. 3A and 3B are plan views illustrating a protect film of a film adhering device in the preferred embodiment of present invention before and after being located.
Figure 3B:
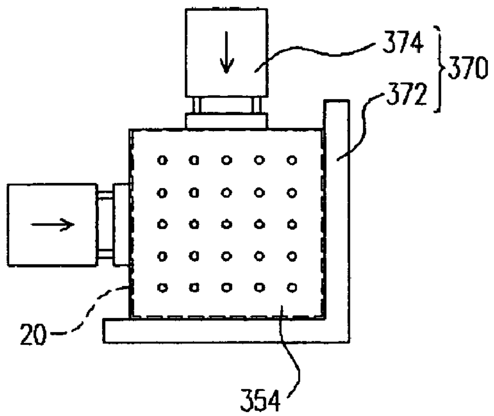

Referring to FIGS. 3A and 3B, the film adhering device 340 further includes an alignment device 370, which is composed of a L shaped stop block 372 and at least an urging part 374. The L shaped stop block 372 is mounted to the sucking disc 354 and the urging part 374 is disposed at a lateral side of the sucking disc 354. When the protect film 20 (shown with dash lines) sucked against the sucking disc 354 is displaced from the original position, the urging part 374 can push two neighboring sides of the protect film 20 and the protect film 20 at another two neighboring sides of the protect film 20 can be pressed against the L shaped stop block 372 as a basis of positioning. In this way, the film adhering device 340 can adhere the protect film 20 to the top of the touch pad 10 accurately.

It is worth to note that the attraction mechanism can be designed to have two vacuum suction stages in order to allow the protect film being able to be positioned more smoothly. The first vacuum suction stage zone corresponds to the edge of the sucking disc 354 and the second vacuum suction stage zone corresponds to the central area of the sucking disc 354. When the protect film 20 releases from the surface of the rolling belt horizontally, the two vacuum suction zones are actuated to attract the protect film 20 simultaneously first. Then, the first vacuum suction stage is closed to stop the attraction force at the edge of the sucking disc 354 so as to facilitate the urging part 374 pushing against the edge of the protect film 20 for accessing locating the protect film 20. Next, the first vacuum suction stage is reopened after the protect film 20 being positioned. Finally, the protect film 20 is pressed down to complete the film sticking operation.

Figure 4:
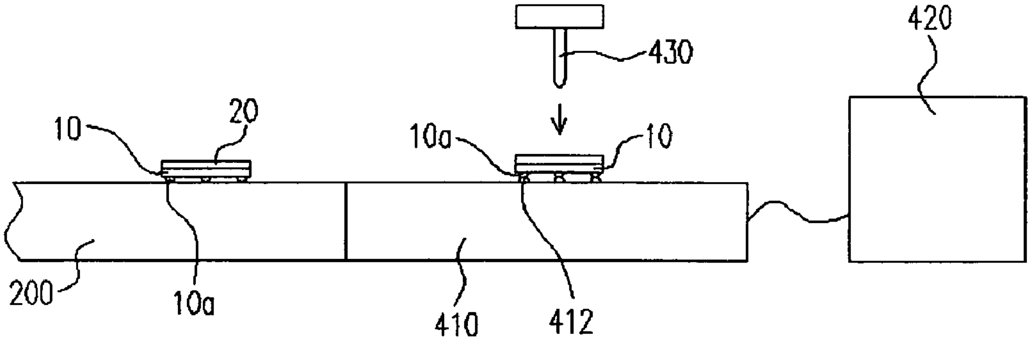
FIG. 4 is a plan view of the test apparatus according to the preferred embodiment of the present invention.

Referring to FIG. 4 in company with FIG. 1, the test apparatus 400 is connected to the transmission mechanism 200 and the test apparatus 400 is composed of a test platform 410, a computer device 420 and at least a test rod 430. The test platform 410 is provided with a plurality of test probes 412 to contact with a plurality of contact spots 10*a* at the bottom of the touch pad 10 while the touch pad 10 is delivered by the transmission mechanism 200 to the test platform 410 after the operation of film sticking. The computer device 420 is electrically connected to the probes 412 and the test rod 430 is moved to the upper surface of the touch pad 10 with a preset locus mechanically and carries the test value out. The test value is then input to the computer device by the probe 412 to compare with the preset value in the computer.

In short, if error between the test value and the preset value is in an acceptable range, the touch pad 10 is determined being a qualified touch pad. Contrarily, if the error is beyond the acceptable range, the touch pad 10 is determined being an unqualified touch pad. As the foregoing, the test apparatus of the present invention is completely automatic instead of the conventional technique done by visual sight manually while determining sensitivity of the touch pad so that the test efficiency an be enhanced and the perfection rate of the touch pad can be increased.

Referring to FIG. 1 again, the test apparatus 400 further includes a distribution device 440, which is composed of at least a bearing tray 442 and a sliding servo table 444. The bearing tray 442 is used for supporting the touch pad 10 and the servo table 444 connects with the bearing tray 442 for moving the bearing tray 442 and dispensing the touch pad 10. After a plurality of touch pads 10 being tested with test apparatus 400 and determined being qualified touch pads or unqualified touch pads in the embodiment, the servo table 444 drives the bearing tray 442 to load the qualified touch pads and the unqualified touch pads separately and carry the qualified touch pads and the unqualified touch pads to the output end 204 and the output end 206 respectively. Hence, the function of dispensing the touch pads 10 can be well performed.

It is worth to note that the embodiment of the present invention takes the touch pad of a laptop computer as an example and persons familiar to the art can understand the test apparatus of the present invention can be applied to any types of touch devices such as PDA or touch panel of a tablet computer and it is not limited to the notebook computer.

It is appreciated that the automatic film sticking/test equipment according to the present invention provides a film sticking apparatus and a test apparatus. The film sticking apparatus allows the protect film temporally adhering on the rolling belt being capable of being horizontally released by way of a film release base automatically and the released protect film can be attracted with vacuum suction and adhered to the surface of a touch pad to shorten the work hour for mounting the protect film and enhance the production efficiency of touch pads. Besides, the test apparatus provides mechanical test probes moving a preset path on the touch pad and bringing output test value of the touch pad to input to the computer device. The test value is compared to a preset value in the computer to distinguish qualified touch pads from unqualified touch pads so as to enhance the test efficiency and increasing perfection rate.

While the invention has been described with referencing to a preferred embodiment thereof, it is to be understood that modifications or variations may be easily made without departing from the spirit of this invention, which is defined by the appended claims.

What is claimed is:

1. A film sticking/testing equipment, which is suitable for a plurality of touch pads being adhered with a film and being tested and each of the touch pads at the bottom thereof having a plurality of contact spots, comprising:

a transmission mechanism with a delivering path;

a film sticking apparatus on the transmission mechanism; and a test apparatus, being connected to the transmission mechanism;

characterized in that the test apparatus comprises:

a test platform, providing at least a probe for contacting with one of the contact spots;

a computer device, electrically connecting with the probe; and at least a test rod, being capable of moving a locus at the upper surface of the touch pad to carry a test value ouput from the touch pad to a computer device for the test value output being compared with a preset value in the computer.

* * * * *